United States Patent
Labarbera et al.

(10) Patent No.: US 11,718,299 B2
(45) Date of Patent: Aug. 8, 2023

(54) FEED-FORWARD COMPENSATION TO MANAGE LONGITUDINAL DISTURBANCE DURING BRAKE-TO-STEER

(71) Applicants: Steering Solutions IP Holding Corporation, Auburn Hills, MI (US); Continental Automotive Systems, Inc., Auburn Hills, MI (US)

(72) Inventors: Joseph A. Labarbera, Birch Run, MI (US); Clinton L. Schumann, Holly, MI (US); Scott T. Sanford, Swartz Creek, MI (US); Michael Wyciechowski, Grand Blanc, MI (US); Emmanuel Garcia, South Lyon, MI (US)

(73) Assignees: Continental Automotive Systems, Inc., Auburn Hills, MI (US); Steering Solutions IP Holding Corporation, Auburn Hills, MI (US)

( * ) Notice: Subject to any disclaimer, the term of this patent is extended or adjusted under 35 U.S.C. 154(b) by 0 days.

(21) Appl. No.: 17/504,420

(22) Filed: Oct. 18, 2021

(65) Prior Publication Data
US 2023/0121296 A1    Apr. 20, 2023

(51) Int. Cl.
*B60W 30/18* (2012.01)
*B62D 11/08* (2006.01)
(Continued)

(52) U.S. Cl.
CPC ...... *B60W 30/18145* (2013.01); *B60W 10/04* (2013.01); *B60W 10/18* (2013.01);
(Continued)

(58) Field of Classification Search
CPC ............. B60W 10/04; B60W 10/18; B60W 30/18145; B60W 2510/18;
(Continued)

(56) References Cited

U.S. PATENT DOCUMENTS

| 7,318,629 B1 | 1/2008 | Sun et al. |
| 2010/0185375 A1* | 7/2010 | Hanzawa ............. B60W 10/10 701/70 |

(Continued)

FOREIGN PATENT DOCUMENTS

EP    2512886 B1    12/2014

OTHER PUBLICATIONS

German Office Action dated May 10, 2022; Application No. 10 2022 102 447.4; Applicant: Continental Automotive Systems, Inc. et al.; 16 pages.
(Continued)

*Primary Examiner* — Edwin A Young
(74) *Attorney, Agent, or Firm* — Lorenz & Kopf LLP

(57) ABSTRACT

A number of illustrative variations may include a system and method of controlling vehicle slowing while implementing brake-to-steer functionality that may include providing a feed-forward gain on vehicle propulsion torque to achieve or maintain target longitudinal acceleration and replicate the behavior of a vehicle not using brake-to-steer. The system may manipulate propulsion of the vehicle to manage longitudinal acceleration disturbance and speed disturbance during brake-to-steer.

14 Claims, 2 Drawing Sheets

(51) Int. Cl.
*B60W 10/04* (2006.01)
*B60W 10/18* (2012.01)

(52) U.S. Cl.
CPC ......... *B62D 11/08* (2013.01); *B60W 2510/18* (2013.01); *B60W 2520/10* (2013.01); *B60W 2540/10* (2013.01); *B60W 2710/0666* (2013.01); *B60W 2710/083* (2013.01); *B60W 2710/18* (2013.01); *B60W 2720/10* (2013.01); *B60W 2720/106* (2013.01)

(58) Field of Classification Search
CPC ......... B60W 2520/10; B60W 2540/10; B60W 2710/0666; B60W 2710/083; B60W 2710/18; B60W 2720/10; B60W 2720/106; B62D 11/08
See application file for complete search history.

(56) References Cited

U.S. PATENT DOCUMENTS

2017/0072953 A1* 3/2017 Nemoto ................ B60W 30/16
2021/0179100 A1* 6/2021 Fritz .................... B60W 30/10

OTHER PUBLICATIONS

Larsson, K. Ghasemiani, "Brake Control for Lateral Vehicle Dynamics" Master's Thesis in Automotive Engineering. Chalmers University of Technology, 2015.

* cited by examiner

FEED-FORWARD COMPENSATION TO MANAGE LONGITUDINAL DISTURBANCE DURING BRAKE-TO-STEER

TECHNICAL FIELD

The field to which the disclosure generally relates to includes steering, braking, and propulsion systems.

BACKGROUND

Vehicles typically include steering systems including electronic power steering systems incorporating steer-by-wire technology or brake-to-steer technology. A vehicle with a functioning steering system may maintain a constant velocity when a steering input is applied. In a brake-to-steer scenario, applying the brakes to steer a vehicle causes the vehicle to slow down. This behavior may be undesirable to the driver.

SUMMARY OF ILLUSTRATIVE VARIATIONS

A number of illustrative variations may include a system using vehicle brakes to steer a vehicle. In such a system, brake-to-steer functionality may cause undesirable slowing of the vehicle. A system and method of controlling vehicle slowing while implementing brake-to-steer functionality may include providing a feed-forward gain on vehicle propulsion torque to achieve or maintain target longitudinal acceleration and replicate the behavior of a vehicle not using brake-to-steer.

A system and method of controlling vehicle speed and acceleration while implementing brake-to-steer functionality may include providing powertrain torque requests on vehicle propulsion torque to compensate for braking while achieving or maintaining target longitudinal acceleration and replicate the behavior of a normally functioning car. The system may manipulate propulsion of the vehicle to manage longitudinal acceleration disturbance and speed disturbance during brake-to-steer.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

Figure 1:
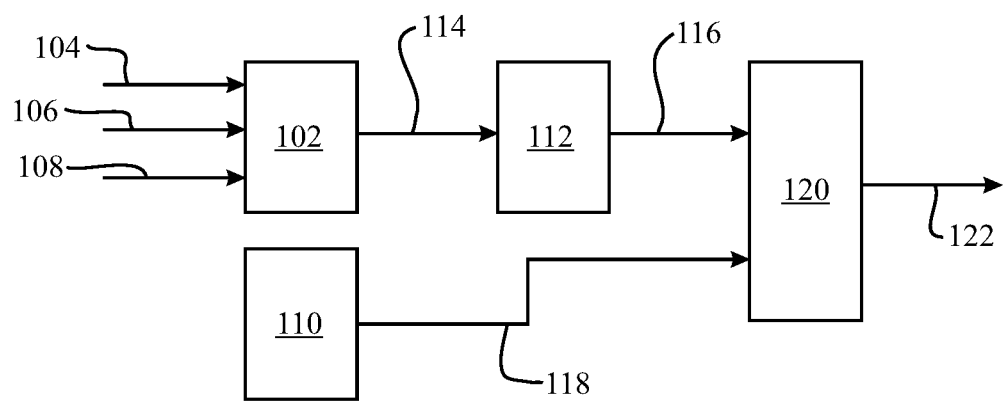
FIG. 1 depicts an illustrative variation of a block diagram of a system and method for managing longitudinal disturbance during brake-to-steer.

The following description of the variations is merely illustrative in nature and is in no way intended to limit the scope of the invention, its application, or uses.

In a number of illustrative variations, a vehicle may comprise a steering system. In such cases, the steering system may be manually operable by the driver via a steering interface, autonomously operable by an autonomous steering system, or operable as a combination of autonomous and manual steering wherein the steering system is configured to receive and interpret steering input from a driver, the autonomous steering system, or both at the same time. In a number of illustrative variations, a steering interface may comprise a handwheel, a joystick, a trackball, a slider, a throttle, a pushbutton, a toggle switch, a lever, a touchscreen, a mouse, or any other known means of user input.

In a number of illustrative variations, a vehicle may comprise a steering system comprising a steering interface and a steerable propulsion system such as but not limited to a steering wheel and road wheels, respectively. The steering system may be of the steer-by-wire type wherein physical mechanisms do not mechanically communicate a manipulation of the steering interface to the steerable propulsion system and wherein a manipulation of the steering interface affects an associated manipulation of the steerable propulsion system via the communication of electronic devices such as but not limited to sensors, transceivers, and electronically excited actuators. According to some variations, a steer-by-wire system may include at least one road wheel actuator and at least one a handwheel actuator in operable communication with one another via a steer-by-wire system or controller. The steer-by-wire system may include a road wheel actuator system in operable communication with a hand wheel actuator system wherein rotation of the steering wheel or handwheel of a vehicle translates to actuation of the road wheel actuator system such that a vehicle wheel may be turned.

The handwheel actuator assembly may include a steering wheel, a handwheel actuator, such as an electronic motor, and a hand wheel angle sensor. The handwheel actuator assembly may be constructed and arranged communicate handwheel angle and position to the road wheel actuator assembly including at least one steering actuator constructed and arranged to pivot or turn a road wheel.

In a number of illustrative variations, a vehicle may include electronic braking system constructed and arranged to apply brake pressure or brake force to any number of road wheels to slow or stop a vehicle based upon driver handwheel input. The electronic braking system may be in operable communication with the steer-by-wire system, hand wheel actuator assembly, and road wheel actuator assembly via at least one controller. The controller may implement any number of systems, including algorithms, for monitoring and controlling propulsion, steering, and braking. According to some variations, the electronic braking system may be utilized to apply differential brake pressure or brake force to a number of wheels to effectuate lateral motion of the vehicle where a portion of a steer-by-wire system has failed, such as an operable disconnect between the wheel actuator assembly and the roadwheel actuator assembly.

In a number of illustrative variations, an electronic braking system may utilize a brake-to-steer system including a brake-to-steer algorithm that may communicate brake force requests to individual wheels as a function of driver steering inputs including steering angle, steering angle rate, and steering torque to steer a vehicle. The brake-to-steer algorithm may communicate brake force requests when the system has detected a road wheel actuator failure or shut down leading to no output capable of a steering rack.

Alternatively, the brake-to-steer algorithm may communicate brake force requests when the system has detected hand wheel actuator failure or shut down.

According to some variations, a brake-to-steer system may be controlled by an external domain controller constructed and arranged to employ brake-to-steer functionality where a steer-by-wire system, including handwheel actuators and roadwheel actuators, loses power or fails entirely. Brake-to-steer functionality may affect vehicle acceleration and speed such as, but not limited to, longitudinal disturbance.

A system for managing longitudinal disturbance in a vehicle may include monitoring brake force requests commanded to steer a vehicle during brake-to-steer functionality. Brake force requests may be converted into brake forces or brake torque acting on a vehicle which may be used to calculate longitudinal acceleration disturbance caused by brake-to-steer. Driver intent for longitudinal acceleration can be determined according to information received from the engine, transmission, and accelerator pedal position. A feed-forward gain strategy of propulsion torque can be implemented based on the magnitude of the pressure applied by brake-to-steer in conjunction with driver intent. As a non-limiting example, the magnitude of the propulsion torque request may be equal to the braking torque if a constant longitudinal velocity is desired. If it is determined that the driver wants to slow down or speed up the vehicle the feed-forward command can be adjusted accordingly. According to some embodiments, system dynamics of the powertrain, driveline, and vehicle may require lead or lag filters to be applied to the command. As a non-limiting example, in heavy braking applications, it may be physically impossible to maintain the desired longitudinal state and the feed-forward longitudinal compensation shall achieve the best possible performance given the capability of its propulsion system, relative to its braking system.

As a non-limiting example, in a vehicle traveling down a roadway where a steering actuator has failed within the vehicle, brake-to-steer functionality may be engaged as a fallback mechanism for lateral control of the vehicle. If the vehicle enters a curve or turn in the roadway, brake-to-steer functionality will apply brake pressure or brake force to steer the vehicle. The system may calculate a feed-forward propulsion torque request based on brake pressure commands and driver intent for longitudinal acceleration. The system may allow the vehicle to maintain desired longitudinal acceleration as interpreted from the driver.

A system for managing longitudinal disturbance in a vehicle may be implemented on any number of controllers within a vehicle environment such as, but not limited to, a domain controller or actuator controller including braking electronic control units and steering handwheel actuators during steer-by-wire operation or road wheel actuator failure.

A system for managing longitudinal disturbance in a vehicle may be implemented on vehicles with traditional power steering or steer-by-wire, also vehicles intended to be operated by a human, or self-driving vehicles. A system for managing longitudinal disturbance in a vehicle may be implemented on vehicles with internal combustion engines that are single axel driven either front or rear, vehicles with internal combustion engines that are dual axel driven, vehicles with electric propulsion systems that are single axel driven either front or rear, vehicles with electric propulsion systems that are dual axel driven, vehicles with 4 electric propulsion systems that independently control torque to all 4 wheels.

According to one variation, a system for managing longitudinal disturbance in a vehicle may be implemented on a powertrain control module receiving information from electronic brake systems and electronic steering systems to determine the need for managing longitudinal disturbance in a vehicle when brake-to-steer functionality is active.

Figure 2:
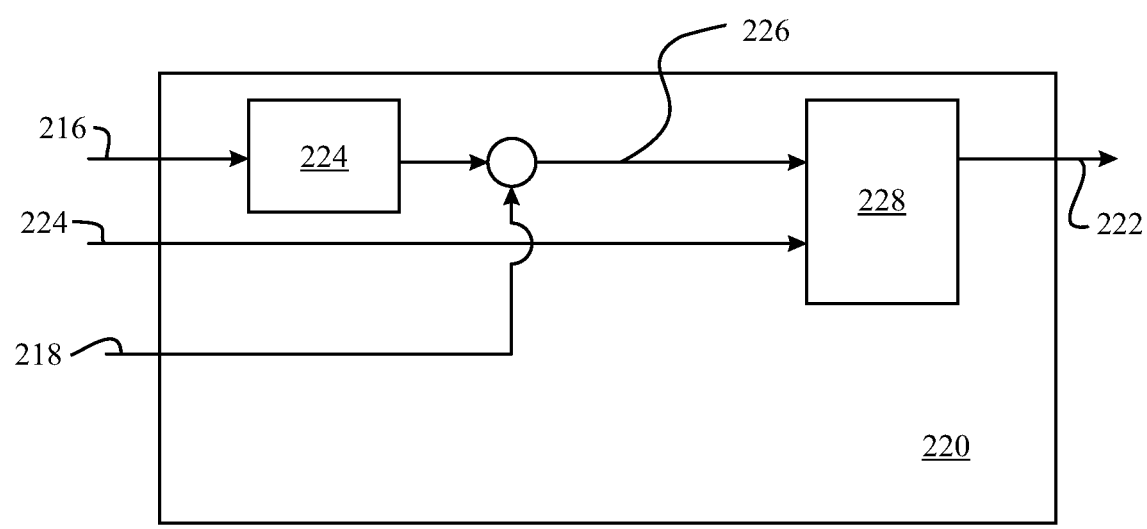
FIG. 2 depicts an illustrative variation of a block diagram of a system and method for managing longitudinal disturbance during brake-to-steer.

FIGS. 1-2 are simply illustrative. The functionality of various systems or algorithms may be carried out by one or more controllers situated anywhere in a vehicle. One or more algorithms may be used and executed by one or more electronic processors to accomplish the methods, actions, and functionality described herein.

FIG. 1 depicts an illustrative variation of block diagram of a system and method managing longitudinal disturbance in a vehicle during brake-to-steer that may include a longitudinal feed-forward compensation module 120 constructed and arranged to communicate propulsion torque requests 122 to a propulsion system in a vehicle. The longitudinal feed-forward compensation module 120 may receive brake commands 118 from a brake-to-steer module 110. The longitudinal feed-forward compensation module 120 may additionally receive desired longitudinal acceleration requests 116 from a longitudinal kinematic motion controller 112. The longitudinal kinematic motion controller 112 may receive desired vehicle speed requests 114 from a driver intent calculation module 102. The driver intent calculation module 102 may receive vehicle data such as, but not limited to, vehicle speed 104, accelerator pedal position data 106, and powertrain state data 108. In this way, vehicle speed data 104, accelerator pedal position data 106, and powertrain state data 108, may be combined with brake commands 118 from a brake-to-steer system 110 to generate propulsion torque requests 122 which may be communicated to a propulsion system within a vehicle utilizing brake-to-steer such that acceleration in vehicle propulsion may be modified to maintain desired longitudinal acceleration and speed as interpreted by a driver.

FIG. 2 depicts an illustrative variation of block diagram of a system and method managing longitudinal disturbance in a vehicle during brake-to-steer that may include a longitudinal feed-forward compensation module 220 constructed and arranged for generating at least one propulsion torque request based on the desired longitudinal acceleration and the at least one brake command. The system may include receiving a desired longitudinal acceleration 216, calculating a target force 224, receiving at least one brake command 218 from a brake-to-steer system, and generating a target propulsion force 226 to be communicated to a vehicle speed dependent feed-forward gain module 228. Target force 224 may be the estimated total force applied to a vehicle to achieve a desired acceleration. Target propulsion force 226 may be the estimated propulsion force required to negate force associated with vehicle braking such that desired longitudinal acceleration may be achieved. Vehicle speed data 224 may be communicated to the vehicle speed dependent feed-forward gain module 228. The vehicle speed dependent feed-forward gain module 228 may generate a propulsion torque request 222. The system may include communicating the at least one propulsion torque request 222 to a propulsion system within a vehicle and manipulating vehicle propulsion systems to manage longitudinal disturbance such as, but not limited to, reducing deceleration of the vehicle during brake-to-steer.

The following description of variants is only illustrative of components, elements, acts, product, and methods considered to be within the scope of the invention and are not in any way intended to limit such scope by what is specifically disclosed or not expressly set forth. The components, elements, acts, product, and methods as described herein may be combined and rearranged other than as expressly described herein and still are considered to be within the scope of the invention.

According to variation 1, a method may include calculating driver intent based upon at least one of a vehicle speed data, an accelerator pedal position data, or at least one powertrain state data; generating a desired vehicle speed based on driver intent; communicating desired vehicle speed to a longitudinal kinematic motion controller; generating a desired longitudinal acceleration based on desired vehicle speed; communicating desired longitudinal acceleration to a longitudinal feed-forward compensation module; communicating at least one brake command to the longitudinal feed-forward compensation module; and generating at least one propulsion torque request based on the desired longitudinal acceleration and the at least one brake command.

Variation 2 may include a method as in claim variation 1 further including communicating the at least one propulsion torque request to a propulsion system within a vehicle.

Variation 3 may include a method as in any of variations variation 1 through 2 further including manipulating propulsion of the vehicle to manage longitudinal disturbance during brake-to-steer.

Variation 4 may include a method as in any of variations variation 1 through 3 wherein manipulating propulsion of the vehicle to manage longitudinal disturbance during brake-to-steer includes at least one of increasing or decreasing acceleration of the vehicle via a propulsion system within the vehicle.

Variation 5 may include a method as in any of variations variation 1 through 4 wherein generating at least one propulsion torque request based on the desired longitudinal acceleration and the at least one brake command includes receiving a desired longitudinal acceleration data; calculating a target force; receiving at least one brake command from a brake-to-steer system; calculating a target propulsion force based on the target force and the at least one brake command; communicating the target propulsion force to a vehicle speed dependent feed-forward gain module; communicating the vehicle speed data to the vehicle speed dependent feed-forward gain module; and generating at least one propulsion torque request.

Variation 6 may include a method as in any of variations variation 1 through 5 further including receiving at least one of a vehicle speed data, an accelerator pedal position data; or at least one powertrain state data prior to determining driver intent based upon at least one of a vehicle speed data, an accelerator pedal position data, or at least one powertrain state data.

Variation 7 may include a method as in any of variations variation 1 through 6 wherein determining driver intent includes correlating vehicle speed data, accelerator pedal position data, and powertrain state data to determine if a driver desires to at least one of maintain, increase, or decrease vehicle speed.

Variation 8 may include a method as in any of variations variation 1 through 7 wherein communicating at least one brake command to the longitudinal feed-forward compensation module includes communicating at least one brake command to the longitudinal feed-forward compensation module from a brake-to-steer system.

According to variation 9, a method for use in a vehicle having a plurality of vehicle systems including a braking system configured to manipulate a brake set, a steering system configured to adjust a roadwheel direction, a propulsion system configured to deliver driving power to at least one roadwheel, a brake-to-steer system, and a controller in operable communication with the braking system, steering system, and propulsion system. The method may include implementing the brake-to-steer system within the vehicle including communicating brake commands to the braking system; generating a vehicle speed data; generating an accelerator pedal position data; generating at least one powertrain state data; communicating at least one of the vehicle speed data, accelerator pedal position data, or at least one powertrain state data to a driver intent function; determining driver intent based upon at least one of the vehicle speed data, accelerator pedal position data, or at least one powertrain state data to determine a desired vehicle speed; communicating desired vehicle speed to a longitudinal kinematic motion controller; generating a desired longitudinal acceleration based on desired vehicle speed via the longitudinal kinematic motion controller; communicating desired longitudinal acceleration to a longitudinal feed-forward compensation module; and communicating brake commands to a longitudinal feed-forward compensation module constructed and arranged to communicate propulsion torque requests to the propulsion system in the vehicle.

Variation 10 may include a method as in any of variation 9 further including manipulating propulsion of the vehicle to manage longitudinal disturbance during brake-to-steer.

Variation 11 may include a method as in any of variations 9 through 10 wherein manipulating propulsion of the vehicle to manage longitudinal disturbance during brake-to-steer includes at least one of increasing or decreasing acceleration of the vehicle via a propulsion system within the vehicle.

Variation 12 may include a method as in any of variations 9 through 11 further including, prior to communicating brake commands to a longitudinal feed-forward compensation module constructed and arranged to communicate propulsion torque requests to the propulsion system in the vehicle performing the following steps. Receiving a desired longitudinal acceleration data; calculating a target force; receiving at least one brake command from a brake-to-steer system; calculating a target propulsion force based on the target force and the at least one brake command; communicating the target propulsion force to a vehicle speed dependent feed-forward gain module; communicating the vehicle speed data to the vehicle speed dependent feed-forward gain module; and generating at least one propulsion torque request.

Variation 13 may include a method as in any of variations 9 through 12 wherein determining driver intent includes correlating vehicle speed data, accelerator pedal position data, and powertrain state data to determine if a driver desires to at least one of maintain, increase, or decrease vehicle speed.

According to variation 14, system for managing longitudinal disturbance in a vehicle during brake-to-steer, the vehicle including a plurality of vehicle systems including a braking system configured to manipulate a brake set, a steering system configured to adjust a roadwheel direction, a propulsion system configured to deliver driving power to at least one roadwheel, a brake-to-steer system, and a controller in operable communication with the braking system, steering system, and propulsion system, may include the following steps. Receiving a vehicle speed data; receiving an accelerator pedal position data; receiving at least one powertrain state data; calculating driver intent based upon at least one of the vehicle speed data, accelerator pedal position data, or at least one powertrain state data; generating a desired vehicle speed based on driver intent; communicating desired vehicle speed to a longitudinal kinematic motion controller; generating a desired longitudinal acceleration based on desired vehicle speed; communicating desired longitudinal acceleration to a longitudinal feed-forward compensation module; and communication at least one brake command to the longitudinal feed-forward compensation module from a brake-to-steer system. The system may further include generating at least one propulsion torque request based on the desired longitudinal acceleration and the at least one brake command, including: receiving a desired longitudinal acceleration data; calculating a target force; receiving at least one brake command from a brake-to-steer system; calculating a target propulsion force based on the target force and the at least one brake command; communicating the target propulsion force to a vehicle speed dependent feed-forward gain module; communicating the vehicle speed data to the vehicle speed dependent feed-forward gain module; and generating at least one propulsion torque request. The system may further include communicating the at least one propulsion torque request to a propulsion system within a vehicle; and manipulating propulsion of the vehicle to manage longitudinal acceleration disturbance and speed disturbance during brake-to-steer.

The above description of select variations within the scope of the invention is merely illustrative in nature and, thus, variations or variants thereof are not to be regarded as a departure from the spirit and scope of the invention.

What is claimed is:

1. A method comprising:
    calculating driver intent based upon at least one of a vehicle speed data, an accelerator pedal position data, or at least one powertrain state data;
    generating a desired vehicle speed based on the driver intent;
    communicating the desired vehicle speed to a longitudinal kinematic motion controller;
    generating a desired longitudinal acceleration based on the desired vehicle speed;
    communicating the desired longitudinal acceleration to a longitudinal feed-forward compensation module;
    communicating at least one brake command to the longitudinal feed-forward compensation module; and
    generating at least one propulsion torque request based on the desired longitudinal acceleration and the at least one brake command.

2. A method as in claim 1 further comprising communicating the at least one propulsion torque request to a propulsion system within a vehicle.

3. A method as in claim 2 further comprising manipulating propulsion of the vehicle to manage longitudinal disturbance during brake-to-steer.

4. A method as in claim 3 wherein manipulating propulsion of the vehicle to manage longitudinal disturbance during brake-to-steer comprises at least one of increasing or decreasing acceleration of the vehicle via the propulsion system within the vehicle.

5. A method as in claim 1 wherein generating at least one propulsion torque request based on the desired longitudinal acceleration and the at least one brake command comprises:
    receiving a desired longitudinal acceleration data;
    calculating a target force;
    receiving the at least one brake command from a brake-to-steer system;
    calculating a target propulsion force based on the target force and the at least one brake command;
    communicating the target propulsion force to a vehicle speed dependent feed-forward gain module;
    communicating the vehicle speed data to the vehicle speed dependent feed-forward gain module; and
    generating the at least one propulsion torque request.

6. A method as in claim 1, further comprising:
    receiving at least one of the vehicle speed data, the accelerator pedal position data; or the at least one powertrain state data prior to determining the driver intent based upon at least one of the vehicle speed data, the accelerator pedal position data, or the at least one powertrain state data.

7. A method as in claim 6 wherein determining the driver intent comprises correlating the vehicle speed data, the accelerator pedal position data, and the at least one powertrain state data to determine if a driver desires to at least one of maintain, increase, or decrease vehicle speed.

8. A method as in claim 1 wherein communicating the at least one brake command to the longitudinal feed-forward compensation module comprises communicating at least one brake command to the longitudinal feed-forward compensation module from a brake-to-steer system.

9. A method for use in a vehicle having a plurality of vehicle systems comprising a braking system configured to manipulate a brake set, a steering system configured to adjust a roadwheel direction, a propulsion system configured to deliver driving power to at least one roadwheel, a brake-to-steer system, and a controller in operable communication with the braking system, the steering system, and the propulsion system, the method comprising:
    implementing the brake-to-steer system within the vehicle comprising communicating brake commands to the braking system;
    generating a vehicle speed data;
    generating an accelerator pedal position data;
    generating at least one powertrain state data;
    communicating at least one of the vehicle speed data, the accelerator pedal position data, or the at least one powertrain state data to a driver intent function;
    determining driver intent based upon at least one of the vehicle speed data, the accelerator pedal position data, and the at least one powertrain state data to determine a desired vehicle speed;
    communicating the desired vehicle speed to a longitudinal kinematic motion controller;
    generating a desired longitudinal acceleration based on the desired vehicle speed via the longitudinal kinematic motion controller;
    communicating the desired longitudinal acceleration to a longitudinal feed-forward compensation module; and
    communicating at least one brake command to the longitudinal feed-forward compensation module constructed and arranged to communicate propulsion torque requests to the propulsion system in the vehicle.

10. A method as in claim 9 further comprising manipulating propulsion of the vehicle to manage longitudinal disturbance during brake-to-steer.

11. A method as in claim 10 wherein manipulating propulsion of the vehicle to manage longitudinal disturbance during brake-to-steer comprises at least one of increasing or decreasing acceleration of the vehicle via the propulsion system within the vehicle.

12. A method as in claim 9 further comprising, prior to communicating the at least one brake commands to the longitudinal feed-forward compensation module constructed and arranged to communicate the propulsion torque requests to the propulsion system in the vehicle:

receiving a desired longitudinal acceleration data;
calculating a target force;
receiving the at least one brake command from the brake-to-steer system;
calculating a target propulsion force based on the target force and the at least one brake command;
communicating the target propulsion force to a vehicle speed dependent feed-forward gain module;
communicating the vehicle speed data to the vehicle speed dependent feed-forward gain module; and
generating at least one propulsion torque request.

13. A method as in claim 9 wherein determining driver intent comprises correlating the vehicle speed data, the accelerator pedal position data, and the at least one powertrain state data to determine if a driver desires to at least one of maintain, increase, or decrease vehicle speed.

14. A system for managing longitudinal disturbance in a vehicle during brake-to-steer, the vehicle comprising a plurality of vehicle systems comprising a braking system configured to manipulate a brake set, a steering system configured to adjust a roadwheel direction, a propulsion system configured to deliver driving power to at least one roadwheel, a brake-to-steer system, and a controller in operable communication with the braking system, the steering system, and the propulsion system, comprising:
receiving a vehicle speed data;
receiving an accelerator pedal position data;
receiving at least one powertrain state data;
calculating driver intent based upon at least one of the vehicle speed data, the accelerator pedal position data, or the at least one powertrain state data;
generating a desired vehicle speed based on the driver intent;
communicating the desired vehicle speed to a longitudinal kinematic motion controller;
generating a desired longitudinal acceleration based on the desired vehicle speed;
communicating the desired longitudinal acceleration to a longitudinal feed-forward compensation module;
communicating at least one brake command to the longitudinal feed-forward compensation module from the brake-to-steer system; and
generating at least one propulsion torque request based on the desired longitudinal acceleration and the at least one brake command, comprising:
receiving a desired longitudinal acceleration data;
calculating a target force;
receiving the at least one brake command from the brake-to-steer system;
calculating a target propulsion force based on the target force and the at least one brake command;
communicating the target propulsion force to a vehicle speed dependent feed-forward gain module;
communicating the vehicle speed data to the vehicle speed dependent feed-forward gain module; and
generating the at least one propulsion torque request;
communicating the at least one propulsion torque request to the propulsion system within the vehicle; and
manipulating propulsion of the vehicle to manage longitudinal acceleration disturbance and speed disturbance during brake-to-steer.

\* \* \* \* \*